Aug. 17, 1948.  E. CARTOTTO  2,447,232
CIRCUIT FOR OBTAINING PULSATING CURRENT OUTPUT
AS A FUNCTION OF DIRECT CURRENT INPUT
Filed May 2, 1947
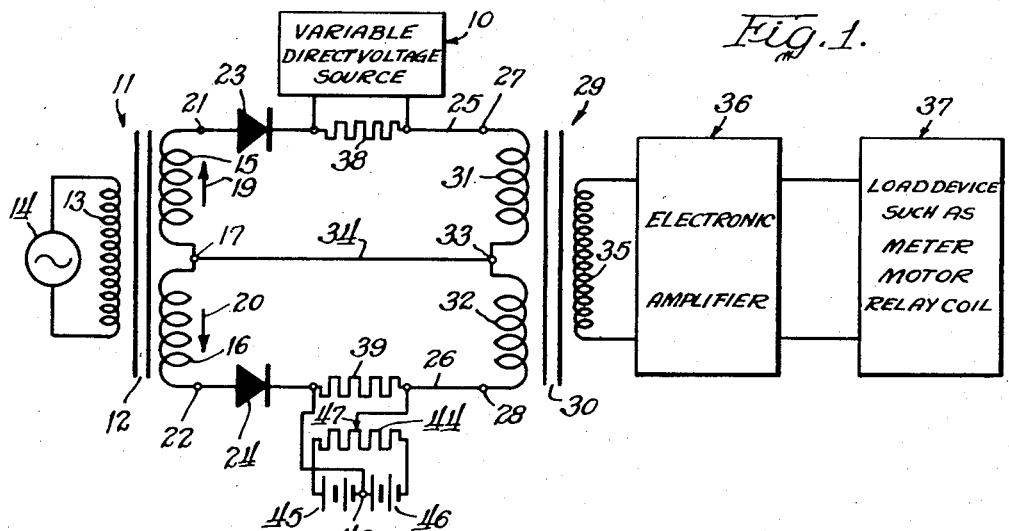
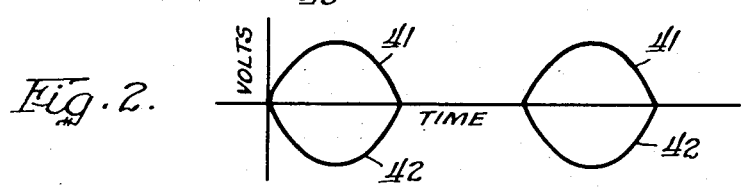
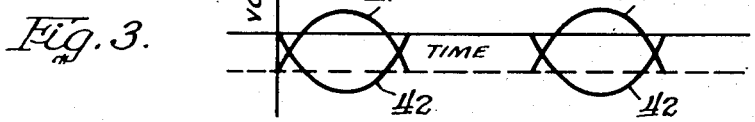
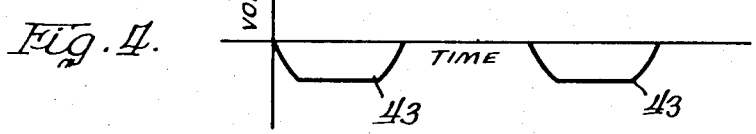
Inventor:
Edward Cartotto.
By Brown, Jackson, Boettcher & Dienner
Attys.

Patented Aug. 17, 1948

2,447,232

UNITED STATES PATENT OFFICE 2,447,232

CIRCUIT FOR OBTAINING PULSATING CURRENT OUTPUT AS A FUNCTION OF DIRECT-CURRENT INPUT

Edward Cartotto, Chicago, Ill., assignor to Illinois Testing Laboratories, Inc., Chicago, Ill., a corporation of Illinois Application May 2, 1947, Serial No. 745,415

7 Claims. (Cl. 171—97)

1

My invention relates, generally, to circuits for obtaining pulsating current output as a function of direct current input, and it has particular relation to the provision of means for providing an alternating voltage which is a function of a variable direct voltage.

Measurements often are made employing a thermocouple, photoelectric cell or the like where the measurement is provided by a corresponding change in flow of direct current. Ordinarily the change is reflected by a small direct voltage which should be amplified to increase the accuracy of the measurement or to provide control functions which may be desired in the light of the variation in the direct voltage. It is to the provision of such a means that my invention is particularly addressed.

Among the objects of my invention are: To provide for obtaining a pulsating voltage which is a function of a variable direct voltage; to employ the direct voltage to modify the balance between two opposed half cycles of alternating current so that a resultant pulsating voltage is obtained; and to convert the pulsating voltage into alternating voltage which can be amplified by conventional electronic amplifying means.

Other objects of my invention will, in part, be obvious and in part appear hereinafter.

My invention is disclosed in the embodiment thereof shown in the accompanying drawing, and it comprises the features of construction, combination of elements, and circuits shown in the accompanying drawing and described in detail hereinafter.

For a more complete understanding of the nature and scope of my invention, reference may be had to the accompanying drawing in which:

Figure 1 illustrates, diagrammatically, the circuit connections that can be employed in practicing my invention; and Figures 2, 3 and 4 show curves which demonstrate certain operating characteristics of my invention, the curves being drawn using units of time as abscissae and units of volts as ordinates.

Referring now particularly to Figure 1 of the drawing, it will be observed that the reference character 10 designates, generally, a variable direct voltage source which may be a thermocouple or it may be a photoelectric cell of the self-generating or barrier type, the output of either being a variable direct voltage which is a function of the temperature of the thermocouple or the light impinging on the photoelectric cell. It will be understood that other sources of variable direct voltage also may be employed. As indicated

2 hereinbefore, it is desired to convert the variable direct voltage into a pulsating voltage and further into an alternating voltage which can be amplified readily by conventional electronic amplifying means.

Accordingly, for this purpose there is provided a transformer that is indicated, generally, at 11. The transformer 11 includes a core 12 of magnetic material on which a primary winding 13 may be wound and arranged to be energized from a suitable source 14 of alternating current. The source 14 may be a 60 cycle 110 volt source. Where it is desired to reduce the size of the transformer 11 or to avoid the difficulties encountered in the amplification of low frequency voltages, higher frequencies, such as frequencies ranging from 400 to 1000 cycles per second, may be employed.

Transformer 11 also includes balanced secondary windings 15 and 16 that are inductively related to the primary winding 13 on the core 12. The windings 15 and 16 are interconnected at a common connection 17, the connection being such that the voltages, indicated by the arrows 19 and 20, are equal and opposite. Care should be taken in constructing the transformer 11 so that the windings 15 and 16 will be substantially identical and will be symmetrically located on the core 12 so that equal voltages will be induced therein. As stated, the secondary windings 15 and 16 are interconnected at the common connection 17 so that the net or resultant voltage appearing across the terminals 21 and 22 thereof is zero.

Now, in order to permit the flow of current through the secondary windings 15 and 16 only in the direction indicated by the arrows 19 and 20, rectifiers 23 and 24 may be connected, as shown, to the terminals 21 and 22 respectively. Rectifiers 23 and 24 may be of the dry type, such as copper-oxide, selenium or germanium crystal rectifiers. The rectifiers 23 and 24 may be connected by conductors 25 and 26 to output terminals 27 and 28 between which an impedance device, such as a transformer shown generally at 29, may be connected.

The transformer may be provided with a core 30 on which primary windings 31 and 32 are wound. These windings are interconnected at a mid-tap 33 which, as shown, may be connected by a conductor 34 to the common connection 17. The transformer 29 also includes a secondary winding 35 on the core 30. It will be understood that the transformer 29 may be a duplicate of the transformer 11, except that the windings 31 and 32 are additively connected.

As will be set forth hereinafter, an alternating voltage is induced in secondary winding 35 of the transformer 29. This voltage can be amplified by a conventional electronic amplifier which is indicated, generally, at 36. The amplified alternating voltage can be employed to operate a load device which is indicated, generally, at 37 and may take the form of a meter, an electric motor, a relay coil, or the like.

The voltage from the source 10 may be introduced into the conductor 25 by providing therein a resistor 38. The variable direct voltage will then be applied across the resistor 38. A balancing resistor 39 is provided in the conductor 26 to maintain circuit symmetry.

Since the voltage of the source 10 as obtained from a thermocouple or photoelectric cell is relatively small, it is desirable that the voltages induced in the secondary windings 15 and 16 be correspondingly small. For example, the ratio of transformation in the transformer 11 may be such that a voltage of about one-half volt is induced in each of the secondary windings 15 and 16. Each of the resistors 38 and 39 may have a resistance of from 75 to 100 ohms.

In describing the functioning of the circuits illustrated in Figure 1, it will be assumed first that the source 10 is disconnected from the conductor 25. Under these conditions as stated, the voltages induced in the secondary windings 15 and 16 are equal and opposite. The voltage applied across the primary winding 31 may be indicated by the curve 41 in Figure 2, while the voltage applied across the primary winding 32 may be indicated by the curve 42 in the same figure. Since these voltages are equal and opposite, there is no resultant voltage appearing between the terminals 27 and 28.

Now, when the source 10 is connected across the resistor 38, the balance previously maintained is upset and, depending upon the polarity of the source 10, the zero axis of the curve 41 is shifted. For example, as illustrated in Figure 3, it may be shifted below its axis as shown in Figure 2. As a result a pulsating voltage, indicated by the curve 43 in Figure 4, appears between the output terminals 27 and 28, this voltage being obtained by adding the voltages represented by the curves 41 and 42 in Figure 3 of the drawing. This pulsating voltage applied between the output terminals 27 and 28 induces an alternating voltage in the secondary winding 35 of the transformer 29. The magnitude of the alternating voltage thus induced is a function of the direct voltage provided by the source 10 as will be understood readily.

Since, in operation, a direct current component flows through the windings 15 and 31, the cores 12 and 30 will become somewhat saturated. In order to compensate for this and to permit operation of the transformers 11 and 29 at various points along their magnetization curves, a source of direct voltage may be connected across the resistor 39. This direct voltage may be provided by means of a potentiometer 44 and two batteries 45 and 46 or equivalent sources of direct voltage. A variable connector 47 may be employed for connecting one terminal of the resistor 39 to the potentiometer 44. The other terminal of the resistor 39 may be connected to a common connection 48 between the batteries 45 and 46. In this maner it is possible to provide a variable direct voltage of either polarity across the resistor 39 as may be desired.

Since certain changes can be made in the foregoing construction and circuits and different embodiments of the invention can be made without departing from the spirit and scope thereof, it is intended that all matter shown in the accompanying drawing shall be interpreted as illustrative and not in a limiting sense.

I claim as my invention:

1. In combination, a transformer having a primary winding for connection to an alternating current source and two balanced secondary windings interconnected to have equal and opposite voltages induced therein, a rectifier connected to each secondary winding to permit current to flow therein only in opposite directions, a pair of output terminals, circuit means interconnecting each secondary winding and one output terminal, and means for introducing a direct voltage into one of said circuit means to shift the zero axis of the half cycles of alternating voltage induced in one secondary winding out of register with the zero axis of the half cycles of alternating voltage induced in the other secondary winding whereby a pulsating voltage appears between said output terminals whose magnitude is a function of the magnitude of said direct voltage.

2. The invention, as set forth in claim 1, wherein a second transformer is provided having a primary winding connected between the output terminals and a secondary winding in which an alternating voltage is induced by the pulsating voltage.

3. In combination, a transformer having a primary winding for connection to an alternating current source and two balanced secondary windings interconnected at a common connection to have equal and opposite voltages induced therein, a rectifier connected to each secondary winding to permit current to flow therein only in opposite directions, a pair of output terminals, impedance means having a mid-tap connected between said output terminals, circuit means interconnecting said common connection and said mid-tap, circuit means interconnecting each secondary winding and one output terminal, and means for introducing a direct voltage into one of the last mentioned circuit means whereby a pulsating voltage appears between said output terminals whose magnitude is a function of the magnitude of said direct voltage.

4. The invention, as set forth in claim 3, wherein a resistor is connected in series with each output terminal and the direct voltage is applied across one resistor.

5. The invention, as set forth in claim 4, wherein means are provided for applying a variable direct voltage across the other resistor to cause the core of the transformer to be worked at different positions along its magnetization curve.

6. The invention, as set forth in claim 5, wherein the means for applying the variable direct voltage across the other resistor includes means for reversing the polarity of such voltage.

7. The invention, as set forth in claim 3, wherein the impedance means comprises a transformer having a primary winding with a mid-tap and a secondary winding in which an alternating voltage is induced by the pulsating voltage.

EDWARD CARTOTTO.

REFERENCES CITED

The following references are of record in the file of this patent:

UNITED STATES PATENTS

| Number | Name | Date |
| --- | --- | --- |
| 1,316,484 | Jonas | Sept. 16, 1919 |